(No Model.) 2 Sheets—Sheet 1.
J. C. SCHUMAN.
MANUFACTURE OF GRAPE SUGAR AND GLUCOSE.
No. 318,309. Patented May 19, 1885.
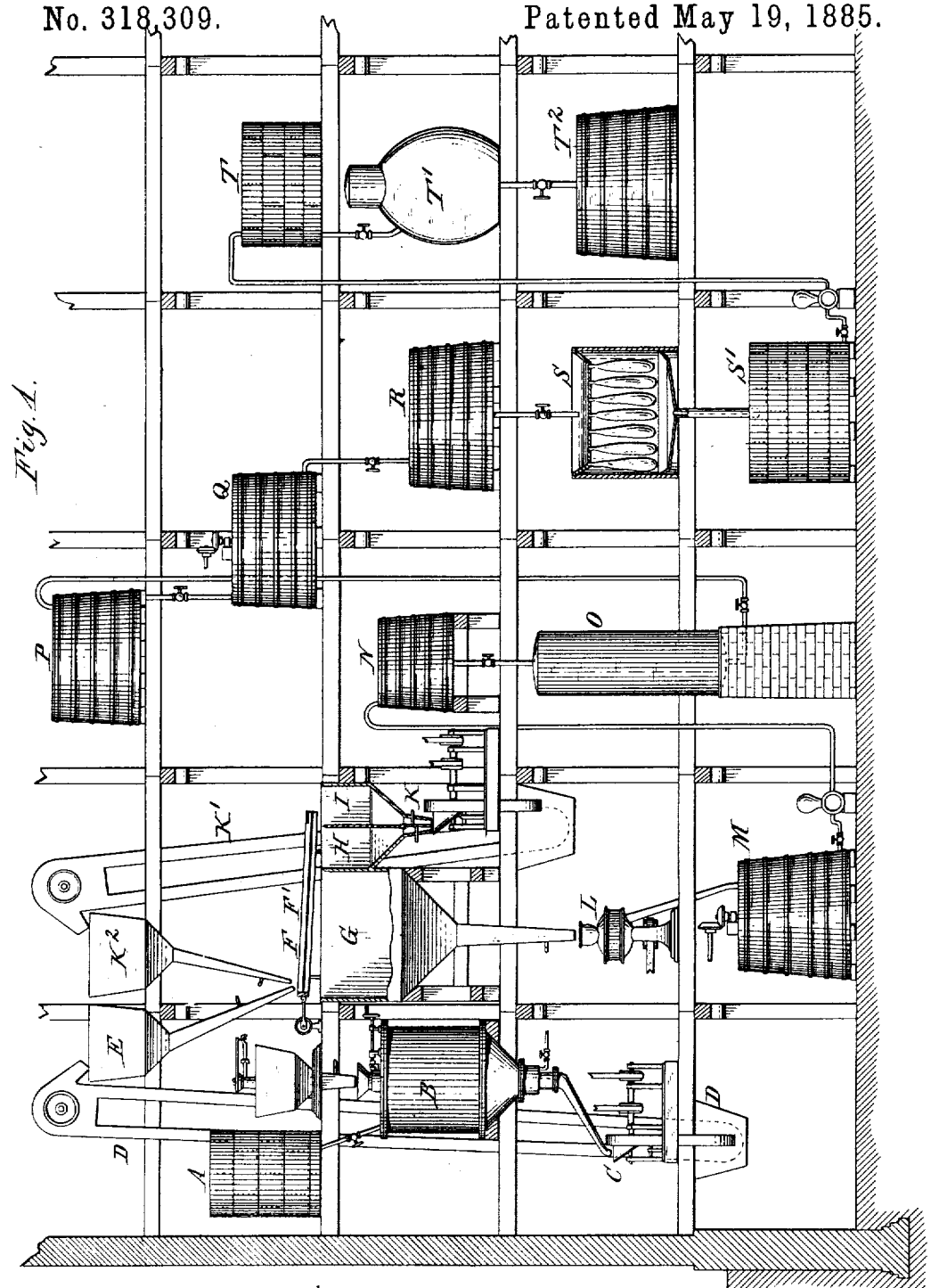

(No Model.) 2 Sheets—Sheet 2.
J. C. SCHUMAN.
MANUFACTURE OF GRAPE SUGAR AND GLUCOSE.
No. 318,309. Patented May 19, 1885.
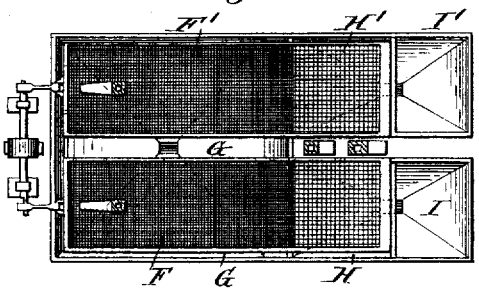
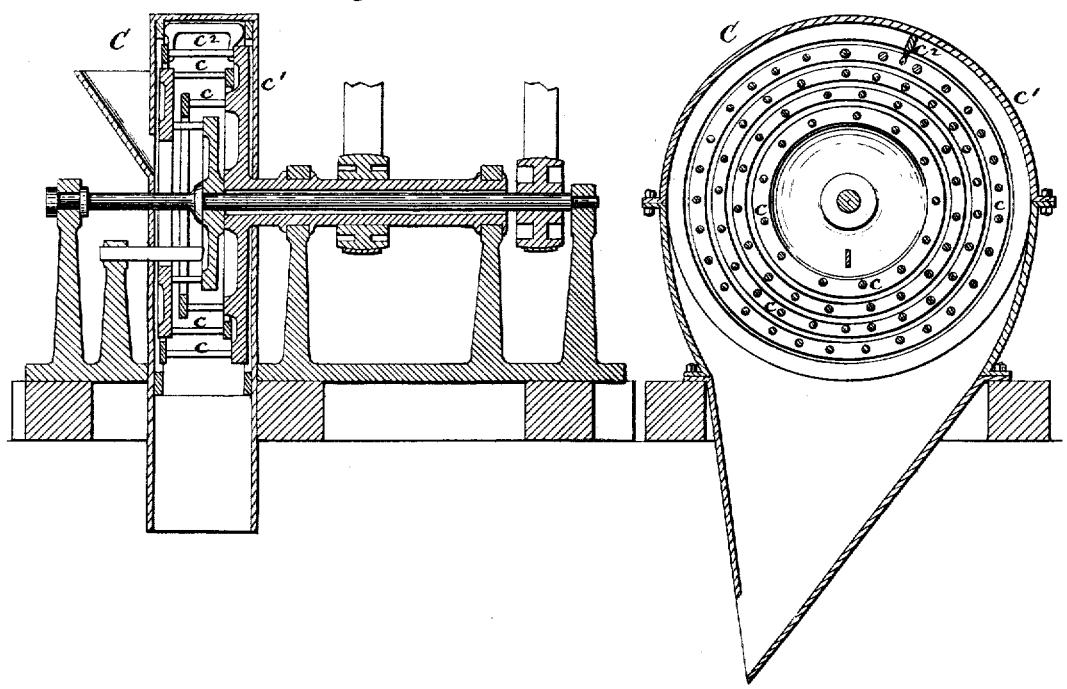

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF GRAPE-SUGAR AND GLUCOSE.

SPECIFICATION forming part of Letters Patent No. 318,309, dated May 19, 1885.

Application filed April 22, 1885. (No specimens.)

*To all whom it may concern:*

Be it known that I, JOHN C. SCHUMAN, of Akron, in the county of Erie and State of New York, have invented new and useful Improvements in the Manufacture of Grape-Sugar and Glucose, of which the following is a specification.

This invention relates to an improvement in the manufacture of grape-sugar and glucose from Indian corn or maize in a simple and economical manner.

A kernel of Indian corn consists of three principal parts—viz., the inner portion or body, which consists, principally, of starch-cells, the outer inclosing hull and its glutinous lining, which consist of wood fiber, nitrogenous compounds, albumen, and oil, which are useful for cattle-feed, and the germ or chit, which is very rich in oil.

In manufacturing grape-sugar or glucose from Indian corn it has been the general practice to eliminate the hulls, gluten, and germs from the starch by grinding the corn with water, then separating the coarse offal from the starch by sifting upon sieves which are supplied with sprays of water, whereby the starch is washed through the meshes of the sieve while the offal tails off, and then separating the gluten and oil from the starch by treatment with caustic alkali and repeatedly depositing and washing the starch, and then converting the refined starch so obtained. This process requires large quantities of water and capacious receptacles for settling the starch, and is comparatively costly, while it leaves the offal in a wet, undesirable condition. It has also been attempted to manufacture grape-sugar and glucose by grinding the corn and directly converting the ground corn containing all of the constituent parts of the grain; but this method has not been successful, because the presence of the hulls, germs, and gluten in the material which is converted discolors the product and leaves in the product gluten and other impurities, which cannot be wholly removed by filtration or any other subsequent treatment, and which cause the product to sour or ferment in warm weather.

The object of my invention is to produce grape-sugar or glucose from Indian corn by removing the hulls, gluten, and germs from the crude starch without going to the extent of manufacturing refined starch, thereby simplifying and cheapening the process and increasing the yield.

My invention consists to that end of the improvements which will be hereinafter fully described, and pointed out in the claims.

In the accompanying drawings, consisting of two sheets, Figure 1 is a sectional elevation of a plant of machinery by which my invention can be carried out. Fig. 2 is a top plan view of the separating-sieves. Figs. 3 and 4 are sectional elevations of the reducing-machine at right angles to each other.

Like letters of reference refer to like parts in the several figures.

A represents a water-tank, which contains hot water used for steeping the corn.

B represents a tank or vat, in which the corn is steeped, and which is supplied with water from the tank A, and constructed with a perforated false bottom for draining. The corn is steeped in this tank at a temperature of about 140° Fahrenheit for about fifteen hours, whereby the grain becomes expanded or swelled. This temperature is maintained in the steeping-tank by renewing the water from time to time. When the corn has been steeped, the starchy body of each kernel has become enlarged and soft, the germ has become similarly enlarged and tends to separate itself by reason of its oily character from the surrounding portions of the starchy body, which has absorbed water, and the hull has become tough and tends to separate, together with its glutinous lining, from the starchy body and oily germ. In steeping the corn care is taken that the temperature does not rise to 155° Fahrenheit, at which temperature the sacks of the starch-cells begin to burst and discharge their contents. When the corn has been steeped, the warm water is drained off, and cold water is introduced into the tank B, whereby the corn is chilled and the hulls are further toughened and the oily germ further loosened from the surrounding portions of the starchy bodies. The water is then drained off from the corn in the tank B.

C represents the reducing-machine, which receives the steeped corn from the tank B, and in which the grain is whipped or beaten, whereby the hulls and their glutinous linings are opened and stripped in large flakes from the inner starchy bodies and from the germs, the starchy bodies being at the same time reduced to fine granules, while the germs are detached from the starchy portions and hulls without being pulverized. The reducing-machine C consists of several concentric rows of beaters, c, revolving at a high speed in opposite directions within an inclosing-case, c'. In order to facilitate the discharge of the material from the machine the outer row of beaters is provided with one or more scrapers, $c^2$, which prevent the material from adhering to the inner side of the inclosing-case of the machine. The corn is reduced in this machine in the moist condition in which it comes from the steep and without additional water. The reduced material is discharged from the reducing-machine C into the foot of an elevator, D, whereby it is conducted to a receiving-hopper, E.

F represents a separating-screen, which receives the reduced material from the hopper E and separates the same into three products—viz., the fine fragments or granules of crude starch, the germs, which are somewhat larger in size, and the flakes of hulls and glutinous linings, which are still larger. To this end the screen is clothed for about two-thirds of its length from its head with fine wire-cloth, which permits only the starch-granules to pass through, and for the remainder of its length with coarse wire-cloth, which permits the germs to pass through, while the hulls or coarse offal escape over the tail of the screen.

G represents a receiver, which collects the starchy material which passes through the upper finely-clothed portion of the screen. H represents a receiver, which collects the germs passing through the lower coarsely-clothed portion of the screen, and I is a receiver, which collects the hulls escaping over the tail of the screen.

K is a supplementary reducing-machine constructed like the machine C, in which the steeped grain is reduced, and receiving the hulls and germs, either or both, from the hoppers H and I, for the purpose of detaching from these products of the separation any starch particles which may adhere to the same, if such further treatment is necessary or desirable. The reduced material coming from the machine K is conducted by an elevator, K', into a hopper, $K^2$, from which it is spouted upon a separating-screen, F', which is arranged on one side of the screen F, and which effects a separation of the detached meal from the germs and hulls, the meal passing into the receiver G, and the germs and hulls into receivers H' and I'.

If it is desired to reduce the starch-meal to a higher degree of fineness, this may be done by a suitable mill, L, which receives the meal from the receiver G. The mill preferably employed for this purpose, when the meal is ground without additional water, is known as the "Bogardus Mill," and consists, essentially, of two serrated or grooved disks having a slight eccentric movement with reference to each other, whereby the gumming or clogging up of the disks is avoided. If the meal is ground wet, ordinary millstones may be employed for the reduction.

M is a tank or vat, which receives the ground starch-meal from the mill L, and in which the starch is puddled with water until the liquid has reached a gravity of from 16° to 20° Baumé. About one per cent. of diluted sulphuric acid is then added to the starch-milk in the vat M and thoroughly mixed therewith. Acid of a strength of sixty-six is preferably employed and diluted in the proportion of one part of acid to two parts of water. The liquid is next pumped from the vat M into a receiver, N, from which it is drawn into the closed converter O, if it is desired to manufacture grape-sugar or block-glucose. The converter is first charged with a sufficient quantity of water to prevent the starch from being burned or coagulated while running it into the converter. The starch is now converted under a steam-pressure of about forty pounds to the square inch. When the desired saccharification of the starch has been accomplished, the liquid is blown out of the converter into a receiving-tank, P. From this tank the liquid is drawn into a tank, Q, in which the acid is neutralized by marble-dust or its equivalent. The liquid is then drawn into a tank, R, in which the bleaching and neutralizing agents are permitted to settle, and from which the liquid passes through the bag-filters S and into a receiver, S'. From the latter the liquid is pumped to a receiver, T, in which the liquid is bleached in a suitable and well-known manner, and from which it is drawn into the vacuum-pan T', in which it is partially evaporated, and from which it is drawn into a receiver, $T^2$. The liquid is then further filtered through bag-filters and charcoal-filters, concentrated in the vacuum-pan, filtered through press-filters, and finally cooled and solidified in any suitable or well-known manner.

If it is desired to manufacture liquid glucose or sirup, the liquid is drawn from the receiver N into an open converter, in which the starch is converted under the pressure of the atmosphere, and from which the liquid is removed when the conversion is completed, and neutralized, filtered, bleached, and concentrated in any usual manner. When the open converter is used, the starch may be run directly into the converter as it comes from the sieves, and the diluted acid may be run into the converter at the same time, both the starch and acid being introduced separately and slowly.

In this method of manufacturing grape-sugar or glucose, the hulls and germs are separated from the crude starch in a slightly moist or comparatively dry state, whereby these products are recovered in a condition in which they can be preserved for a considerable length of time without souring or fermenting, and in which they can be dried at small expense, if desired, thus enabling the manufacturer to dispose of this offal advantageously as feed for cattle, &c. As the hulls and germs constitute about eighteen per cent. of the whole grain treated, this large portion of the material is removed in a useful condition at the outset, and the bulk of the material to be acidulated and converted is greatly reduced, as compared with the processes which convert the whole grain, while the yield of starch which is made available for conversion is not only larger than in the processes in which refined starch is extracted and converted, but is obtained at much smaller expense both in cost of manipulation and cost of the machinery or apparatus employed.

It is obvious that the precise arrangement of the apparatus shown and described is immaterial, and that it may be altered as circumstances may require.

I claim as my invention—

1. The herein-described process of manufacturing grape-sugar or glucose from Indian corn or maize, which consists in steeping the corn, then detaching the hulls and germs from the starchy portions of the kernels by whipping or beating without additional water, then separating the hulls and germs from the crude starch by sifting, and then converting the separated crude starch into grape-sugar or glucose, substantially as set forth.

2. The herein-described process of manufacturing grape-sugar or glucose from Indian corn or maize, which consists in steeping the corn, then detaching the hulls and germs from the starchy portions of the kernels by whipping or beating without additional water, then separating the hulls and germs from the crude starch by sifting, then acidulating the crude starch and converting it into grape-sugar or glucose under pressure, substantially as set forth.

Witness my hand this 20th day of April, 1885.

J. C. SCHUMAN.

Witnesses:
S. B. GOODALE,
EDW. HOAGLAND.